April 28, 1970 R. A. KILGORE 3,509,422
AUTOMATIC PHOTOGRAPHIC FILL-IN FLASH CIRCUIT
Filed Oct. 31, 1967 2 Sheets-Sheet 1

INVENTOR
Robert A. Kilgore
BY Stowell & Stowell
ATTORNEYS

April 28, 1970    R. A. KILGORE    3,509,422
AUTOMATIC PHOTOGRAPHIC FILL-IN FLASH CIRCUIT
Filed Oct. 31, 1967    2 Sheets-Sheet 2

INVENTOR
Robert A. Kilgore
BY Stowell & Stowell
ATTORNEYS

United States Patent Office 3,509,422
Patented Apr. 28, 1970

3,509,422
AUTOMATIC PHOTOGRAPHIC FILL-IN FLASH CIRCUIT
Robert A. Kilgore, Export, Pa., assignor, by mesne assignments, to Research Corporation, New York, N.Y., a nonprofit corporation of New York
Filed Oct. 31, 1967, Ser. No. 679,338
Int. Cl. H01j *39/12;* H05b *41/32, 41/38*
U.S. Cl. 315—151　　　　　　　　　　　　　　6 Claims

ABSTRACT OF THE DISCLOSURE

An automatic photoflash lighting circuit to fill in shadows in subjects already illuminated by ambient light, including means to automatically compare the amount of ambient light on the illuminated portions of the subject with the light produced by a flash unit to thereby provide a flash duration necessary for the desired fill-in illumination. The circuit includes detectors for detecting and producing signals representative of both the ambient light intensity and the reflected flash illumination and means for detecting the difference between these signals to provide a signal which terminates the flash lamp when a predetermined quantity of light energy from the flash lamp has been reflected.

BACKGROUND OF THE INVENTION

This invention relates to automatic flash apparatus and more particularly to an automatic photoflash lighting unit to fill in shadows in existing light pictures illuminated by some source of ambient light, as for example, daylight.

In order to properly expose a photographic film, a number of photoflash devices, such as gaseous discharge flash tubes or lamps, have been developed with corresponding impulse-producing electrical circuits to synchronize and control the duration of the photoflash in accordance with variables such as the aperture of the camera and subject distance.

One such photoflash circuit is shown in U.S. Patent 3,122,677 to Flider which produces high intensity photoflashes having a predetermined controlled flash duration. When a flash is initiated, a timing circuit is energized and timing pulses are produced according to a preset resistance-capacitance timing circuit. The pulses trigger a gas tube which is connected in shunt with the flash lamp. Thus, firing of the tube shunts the flash lamp, according to the setting of the timing circuit.

Another photoflash system is shown in U.S. Patent 3,033,988 to Edgerton whereby the light emitted by the flash lamp is automatically controlled. The circuit includes a photoflash lamp and a photocell monitoring device combined with an integrator which controls a switching device to short circuit the flash lamp when a predetermined light quantity has been reached.

One problem in flash photography which has not been completely solved with prior automatic photoflash systems is that of automatically providing fill-in light to illuminate shadows in subjects illuminated by ambient light which would thus allow a photographer to utilize the realistic qualities of natural light without the accompanying harsh shadows sometimes encountered. Presently, the usually portable lighting equipment used for fill-in light requires tedious calculations for determining proper exposure and is limited by the narrow range in output intensity of portable flash equipment.

SUMMARY OF THE INVENTION

The present invention is adapted to overcome the disadvantages of the prior art fill-in light systems by providing an automatic flash system which will automatically compare the amount of ambient light on the subject with the fill-in light on the subject produced by a flash lamp and thereafter provide a flash duration necessary for proper fill-in lighting.

The flash circuit includes means for detecting both the ambient or natural light intensity and the quantity of reflected flash illumination and means for comparing the level of the two quantities to thereafter provide a signal which will terminate the flash lamp so that a ratio of the above values of illumination will be attained.

Among the objects of the present invention are the provision of an improved photoflash system for automatically controlling the light energy emitted by a flash tube device for fill-in flash illumination and the provision of a photoflash apparatus that will automatically compare the amount of flash light and natural light in order to terminate the flash light when a predetermined amount of fill-in light energy has been provided, relative to the ambient light level.

DESCRIPTION OF THE PREFERRED EMBODIMENTS

It has been determined for electronic flash units that the ratio R of existing light to fill-in light is approximated according to the following equation:

$$R = \frac{(\text{natural light intensity}) \times (\text{camera shutter speed})}{(\text{fill-in light intensity}) \times (\text{duration of flash})}$$

Although it may be possible to vary R to a degree by adjusting the camera shutter speed, this adjustment is only possible provided the shutter can be synchronized with the flash at more than one speed.

Figure 1:
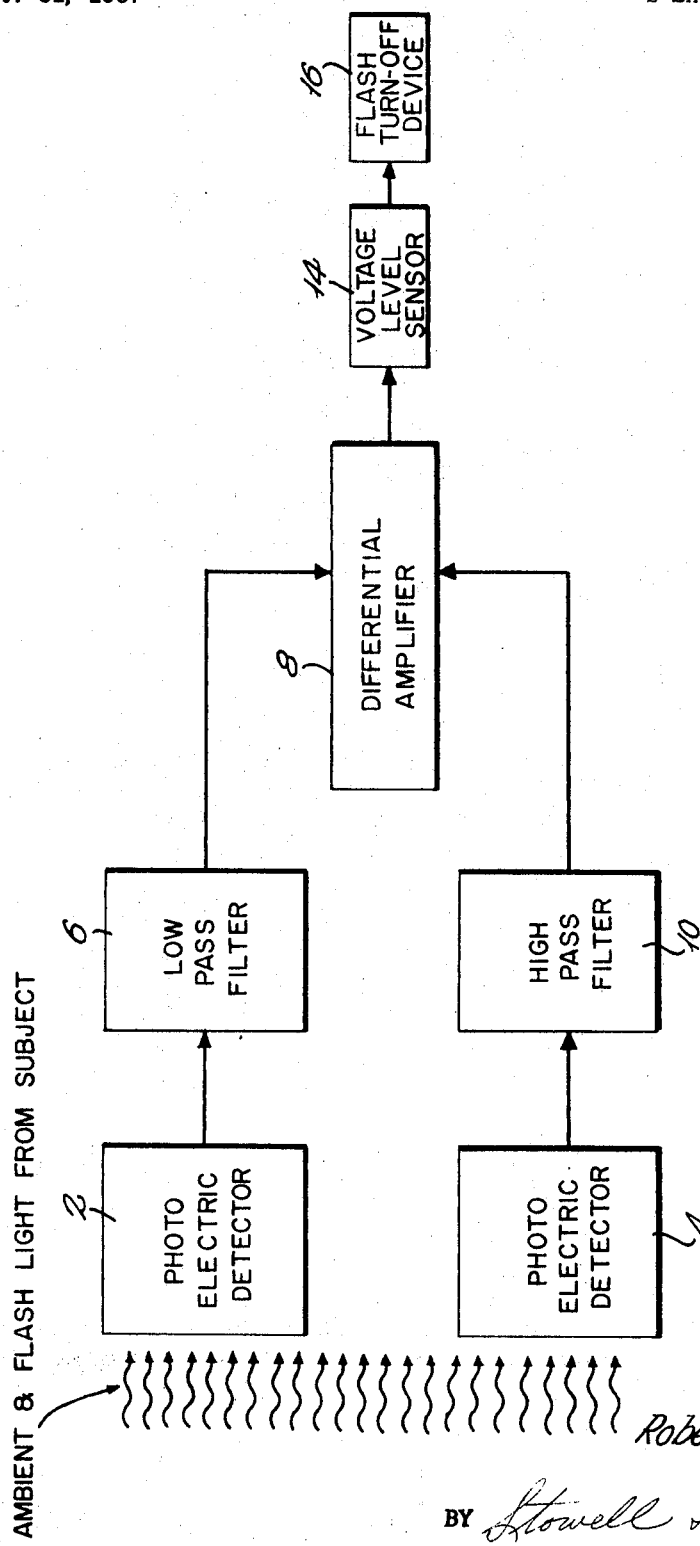
FIG. 1 is a block diagram of the present invention.

Referring to FIG. 1, a block diagram is shown of a system which enables the flash duration to be varied to thus maintain automatically the desired ratio R of natural lighting to fill-in lighting.

Light from the subject falls on two photoelectric detectors 2 and 4. Natural or ambient light (such as sunlight) received by detector 2 produces a signal which is filtered by a low pass filter 6 to eliminate the pulsed effect of the flash light which accordingly is not passed through filter 6. This signal is fed to a differential amplifier comparator 8.

Flash light which is reflected from the subject, falling on detector 4 produces a signal which is fed to a high pass filter 10 which may preferably be defined by an A.C. coupled amplifier having a low-frequency cut-off. Signals resulting from ambient or natural light (low frequency) are thus blocked by filter 10. The resulting signal is then applied to a second input of differential amplifier comparator 8 where the difference between the applied signals is compared and amplified. If desired, a single photoelectric detector may be employed, with its output fed, to separate filters. The output of the differential amplifier 8 is fed to a voltage level sensor 14. When the output signal from the amplifier 8 reaches a preset level, the voltage sensor 14 is triggered into conduction and applies a pulse signal to a flash turn-off circuit 16, which is adapted to turn off the flash lamp of an associated flash lamp circuit (not shown), as will be described hereinbelow.

Figure 2:
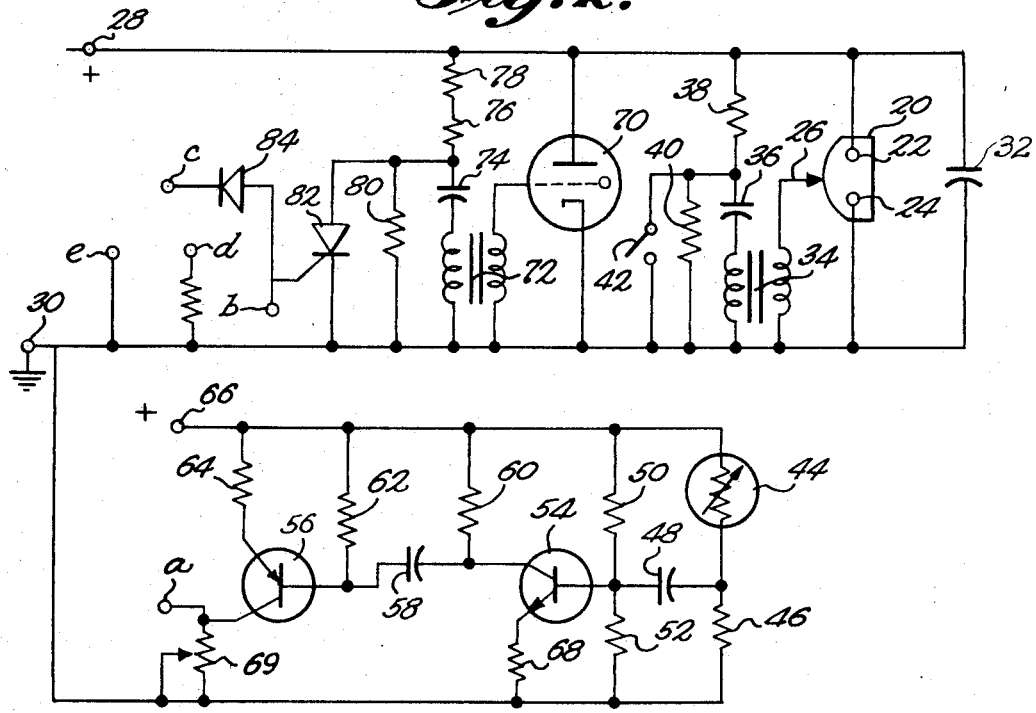
FIG. 2 is a schematic diagram of a known flash lamp circuit adapted for use with the fill-in flash circuit of the present invention.

FIG. 2 illustrates an automated flash circuit of a commercially available flash system presently marketed under the name Honeywell Auto-Strobonar 660 to produce a flash light output which is automatically adjusted to provide greater light for greater distances and lesser light for closeups. This is accomplished by regulating the on-time of a flash tube 20 according to the time required for the time integral of the flash light to reach a predetermined level. The exact manner in which the Honeywell system effects such integration is not known by me, however, such a knowledge is not necessary for a complete understanding of the present invention.

The flash tube 20, having main electrodes 22 and 24 and a trigger electrode 26, is connected across the input terminals 28 and 30 of a conventional 500 volt portable power source such as a battery pack and high voltage converter unit (not shown). A flash output capacitor 32, which is adapted to be charged to operating potential by the 500 volt source, is connected to the main electrodes 22 and 24 of the flash tube 20. A flash triggering circuit, which is also connected across the high voltage supply, includes a triggering transformer 34, a triggering capacitor 36, a resistor 38 coupled between the triggering capacitor 36 and input terminal 28, a resistor 40 connected in parallel with capacitor 36 and the primary of triggering transformer 34 and a switch 42 which may be operably connected to the shutter contacts of an associated camera or the like which is shunted across resistor 40 to provide a discharge path for capacitor 36.

The flash modulation circuit includes a circuit for monitoring the light and a circuit for cutting off the flash light when a predetermined level has been reached. A cadmium sulfide photocell detector 44, which may be optically biased by a small lamp (not shown) to improve or change the detector 44 frequency response, is provided to monitor flash light from the flash tube 20 as it bounces back from the subject. A resistor 46 is connected between the detector 44 and the ground terminal 30. A coupling capacitor 48 is connected to the midpoint of a voltage divider circuit comprised of resistors 50 and 52. The next stages are A.C. coupled transistor amplifiers 54 and 56 which are coupled by means of coupling capacitor 58 and resistors 60 and 62. The emitter of amplifier 56 is connected through resistor 64 to a low voltage power supply at terminal 66. Amplifier 54 is grounded to terminal 30 by a resistor 68 and amplifier 56 is grounded by variable resistor 69.

The flash cut-off circuit includes a gas filled switching tube 70, such as a thyratron or the like, connected in shunt across the flash tube 20 so that upon its energization it shunts the energy flow to the flash tube 20 from the flash capacitor 32 and cuts off the flash light. The triggering circuit for the switching tube 70 includes a triggering transformer 72 and a triggering capacitor 74 connected in series to resistors 76 and 78 across the main power supply terminals 28 and 30. A resistor 80 is connected in parallel across the primary of the triggering transformer 72 and capacitor 74. A silicon controlled rectifier 82 is shunted across resistor 80 to provide a discharge path for triggering capacitor 74. Diode 84 is connected between the gating electrode 86 of the SCR 82 and point c.

When the circuit is used as a conventional flash modulator, points c in the triggering cut-off circuit and a in the flash monitoring circuit are coupled together by a switching means (not shown in FIG. 2).

Figure 3:
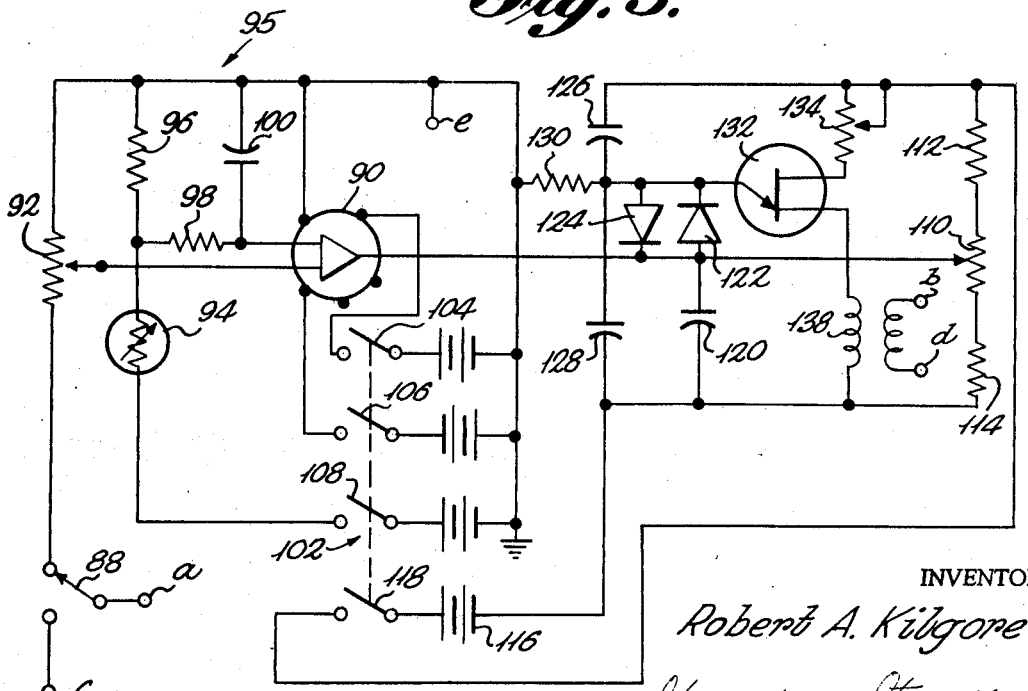
FIG. 3 is a schematic diagram of the automatic flash fill-in modification to the circuit of FIG. 2.

FIG. 3 illustrates the present invention as a modification to the photoflash circuit described with reference to FIG. 2. Points a to e in FIG. 3 correspond with points a to e in FIG. 2. Switch 88 permits the system to be operated to regulate flash light duration as with the commercially available Strobonar 660 or for fill-in flash purposes. With the switch 88 in its lower position, points a and c of the circuit are coupled and the fill-in flash circuit is non-operative. With the switch 88 in its upper position, the fill-in flash circuit is coupled to the photoflash circuit at points a, b, d and e. The output of the monitoring circuit from amplifier 56 is fed into the inverting side of a differential comparator 90 through switch 88 and the top of variable resistor 92.

The differential comparator 90, as known to those in this art, is an article of commerce and one such device which has been found acceptable is known as ωA710 sold by Fairchild Semiconductor.

Ambient light is measured by a photodetector 94 which is coupled to a low pass filter circuit 95 comprised of resistors 96 and 98 and capacitor 100. The output of the low pass filter circuit 95 is coupled to the non-inverting side of the differential comparator 90. A low voltage power supply 102 provides the energy for the ambient light monitoring circuit and differential amplifier and includes three switches 104, 106 and 108 to provide 12, 6 and 4.5 volts respectively. The output of the differential comparator 90 is coupled to a conventional voltage sensing and trigger circuit through the tap of variable resistor 110, which is connected in series with resistors 112 and 114 across a low voltage power supply 116 and switch 118. Capacitor 120 is provided with a charging path through resistor 110 and a discharging path through diode 122. Diodes 124 and 122 are coupled to capacitor 120 to provide a clamping circuit for the input signal to enable capacitor 120 to charge to its steady state voltage when large voltages are present at the input. Capacitors 126 and 128 are coupled to the emitter electrode of a unijunction transistor 132 and provide the initial trigger energy for the transistor 132 while serving as a filter for transients in the circuit. A resistor 130 is coupled between ground and the junction of capacitors 126 and 128. A variable resistor 134 is coupled to a base of unijunction transistor 132 to provide a means for temperature compensation. The other unijunction base is connected to a pulse transformer 138 which provides the pulsed output gating signal to SCR 82 of the flash lamp cut-off circuit through points b and d.

The operation of the fill-in flash system may be described as follows. With the power supply unit on, a 500 volt input is applied across the flash tube 20 and the flash storage capacitor 32 which is charged to its operating potential. The voltage of the flash storage capacitor 32 is not sufficient of itself to cause a gaseous discharge through the flash tube 20 except upon energization of the trigger electrode 26. Simultaneously triggering capacitor 36 is charged through resistor 38. Closing of the switch 42 associated with the camera shutter shunts resistor 40 and provides a discharge path for capacitor 36 which applies a voltage impulse to the primary of the triggering transformer 34. The step-up secondary of the transformer 34 impresses a triggering impulse between the triggering electrode 26 and electrode 24 of the flash tube 20. The energy supplied from the storage capacitor 32 to the flash tube 20 then causes a gaseous discharge in the tube and produces a flash of light.

With the switch 88 in the fill-in flash position the circuit is operative to provide fill-in light flashes to provide proper light exposure. Ambient light detected by photodetector 94 produces a signal which is fed to the filter circuit 95. Here the high frequency effects from the flash light are eliminated. This steady state signal is fed into the noninverting side (a positive input causes a positive output) of the differential comparator 90.

Simultaneously, the flash light from the flash tube 20 is reflected back from the subject and detected by detector 44 which applies a signal to the A.C. coupled amplifiers 54 and 56 whose low frequency cut-off characteristics filter out the effect of the ambient light on the detector. The output signal is applied by way of point a and variable resistor 92 to the inverting side (positive input causes negative output) of the differential comparator 90. The signals from both the flash and the ambient light are thus compared in the comparator 90 and the difference is amplified. The output signal from the comparator 90 is fed to the top of condenser 120. When this output signal reaches a preset level, the unijunction transistor 132 is fired which feeds a pulse signal to the pulse transformer 138. The output of the pulse transformer is coupled to the gate of SCR 82 to trigger it into conduction and shunt resistor 80. This provides a discharge path for capacitor 74 which feeds a pulse signal to pulse transformer 72 the output of which is fed to the gating grid of gaseous discharge tube 70.

Firing of the tube 70 produces a short circuit across the flash tube 20 to terminate the flash.

It will be appreciated that the above description is illustrative only and not limiting and many modifications may be made to the specific embodiment described above. For example, rather than using the circuit for photographic purposes, the concepts described above will work equally well with any type of flashing systems such as stroboscopes and the like.

I claim:

1. An automatic flash circuit for fill-in illumination of a subject comprising:
   a flash producing means,
   energy storage means,
   discharge means to connect said energy storage means to said flash producing means to produce a flash of light,
   means to identify and detect ambient light from the subject, and identify and detect reflected flash light from the subject,
   circuit means to produce signals in response to said light detecting means,
   means to produce a difference signal representative of the difference between said light signals,
   means to terminate said flash of light when said difference signal has reached a predetermined value.

2. The automatic flash circuit of claim 1 wherein said means to detect light comprises a first photocell to detect ambient light from the subject and a second photocell to detect flash light from the subject.

3. The automatic flash circuit of claim 1, wherein said terminating means includes a voltage sensing means to determine when said difference signal has reached a predetermined value, said voltage sensing means producing a signal to activate said flash terminating means.

4. The automatic flash circuit of claim 1 wherein said first-mentioned identifying and detecting means comprises a filter circuit to filter out signals of a short duration attendant flash light and said second-mentioned identifying and detecting means comprises a high pass filter to filter out steady state signals attendant ambient light.

5. The automatic flash circuit of claim 1 wherein said difference signal producing means comprises a differential amplifier.

6. The automatic flash circuit of claim 1 wherein said terminating means comprises an electronic switching means connected in shunt with said flash producing means whereby energizing of said electronic switching means will terminate said flash of light.

References Cited

UNITED STATES PATENTS

| | | | |
|---|---|---|---|
| 2,736,813 | 2/1956 | Cherrier | 250—210 X |
| 2,843,756 | 7/1958 | Wise et al. | 250—210 |
| 3,340,400 | 9/1967 | Quittner | 250—210 X |
| 3,340,426 | 9/1967 | Elliot | 315—151 |
| 3,350,603 | 10/1967 | Erickson | 315—151 |

JAMES W. LAWRENCE, Primary Examiner

C. R. CAMPBELL, Assistant Examiner

U.S. Cl. X.R.

250—209; 315—155, 157, 232, 241, 340